(12) United States Patent
Busch et al.

(10) Patent No.: US 7,311,016 B2
(45) Date of Patent: Dec. 25, 2007

(54) PARK LOCK SYSTEM

(75) Inventors: Charles R. Busch, Frederick town, OH (US); Allan E. Geyer, Marion, OH (US); Benjamin D. Peverly, Howard, OH (US); Michael F. Ryan, Delaware, OH (US)

(73) Assignee: Dana Corporation, Toledo, OH (US)

( * ) Notice: Subject to any disclaimer, the term of this patent is extended or adjusted under 35 U.S.C. 154(b) by 159 days.

(21) Appl. No.: 11/257,687

(22) Filed: Oct. 25, 2005

(65) Prior Publication Data

US 2007/0089552 A1    Apr. 26, 2007

(51) Int. Cl.
    *F16H 3/08* (2006.01)
(52) U.S. Cl. ........................................... 74/363
(58) Field of Classification Search ............. 192/219.4, 192/219.6; 74/363
    See application file for complete search history.

(56) References Cited

U.S. PATENT DOCUMENTS 6,257,081 B1    7/2001  Gagnon et al.
6,648,093 B2    11/2003 Rioux et al.
6,691,815 B2    2/2004  Rioux et al.
6,716,129 B2    4/2004  Bott et al.
6,725,987 B2    4/2004  Koga
6,835,158 B2    12/2004 Sugiura et al.
6,856,880 B2    2/2005  Shimaguchi
2007/0089553 A1* 4/2007 Busch et al. .................. 74/335

FOREIGN PATENT DOCUMENTS

| JP | 63053181    | 3/1988 |
| JP | 2000097253  | 4/2000 |
| JP | 2001146966  | 5/2001 |
| JP | 2001280495  | 10/2001 |
| JP | 2002227999  | 8/2002 |

* cited by examiner

*Primary Examiner*—Dirk Wright
(74) *Attorney, Agent, or Firm*—Marshall & Melhorn LLC

(57) ABSTRACT

The present invention is a method and apparatus for locking a vehicle transmission where at least one directional clutch gear is located on one end of a shaft and a second directional clutch gear and a park flange are located at the other end of the shaft. A single clutch is selectively moved between the at least one directional clutch gear, the second directional clutch gear, the park flange and a neutral position between the two ends of the shaft. The transmission is locked when the single clutch is engaged with the park flange as the flange is secured to the transmission housing.

26 Claims, 7 Drawing Sheets

PARK LOCK SYSTEM

FIELD OF THE INVENTION

The present invention relates to a method and apparatus for locking a vehicle transmission.

BACKGROUND OF THE INVENTION

Various devices for locking a vehicle transmission are known to those skilled in the art. Many of these devices, however, are located externally from the transmission housing, such as at the wheels or at the power take off. Many of these devices also have internal cam lever and cog structures that require two clutch collars. The internal cam levers and cog structures, as well as the clutch collars, add cost and complexity to the transmission.

Examples of the prior art devices described above and others include the system shown in U.S. Pat. No. 6,856,880. In this patent an automatic transmission with several forward gears and one reverse gear is taught. The transmission has a parking feature that uses engagement of both the forward and reverse gear trains to stop the transmission. For example, the first gear train and the reverse gear train can be engaged to prevent the output shaft of the transmission from transmitting drive to the wheels. Such an arrangement puts the input and output shafts in a double mesh state to produce a stopping force and causes the transmission to be in a parked state.

The English abstract of JP2002227999 describes a parking lock system for an automatic transmission. Based on the abstract and the figures only, the system comprises a parking gear mounted on a countershaft where the parking gear is engaged with a pawl. The pawl is engaged with structure 92. Structure 92 comprises a gear mounted on a shaft where the shaft is fixed to the transmission case. Structure 92 also comprises a spring loaded member capable of engaging and disengaging the gear with the pawl.

U.S. Pat. Nos. 6,648,093 and 6,691,815 both teach a pawl assembly mounted on a shift shaft which is connected to a gear shift lever. The pawl assembly functions as a transmission parking brake and comprises an actuating lever engagable with a park lock lever. The park lock lever engages with one of a plurality of teeth on a parking gear mounted on the rear output shaft.

In light of the complex and expensive systems of the prior art, it would be advantageous to have a simple brake feature for a transmission. It would also be advantageous to utilize a single clutch collar to reduce the cost and complexity of the transmission.

SUMMARY OF THE INVENTION

The present invention is directed toward a locking system for a transmission. The system comprises a rotatable clutch shaft, a reverse clutch gear, a stationary park flange, a first forward clutch gear, a second forward clutch gear and a single, shifting clutch collar. The shaft has a first end portion and a second end portion. The reverse clutch gear is rotatable about the shaft and is located about the first end portion of the shaft. The stationary park flange has gear teeth extending into a first void portion defined by the reverse clutch gear and the shaft.

The first forward clutch gear is rotatable about the shaft. The second forward clutch gear is rotatable about the shaft independently from the first forward clutch gear. Both of the clutch gears are located about the second end portion of the shaft. The second forward clutch gear has gear teeth that extend into a second void portion defined by the first forward clutch gear and the shaft.

The shifting clutch collar is slidable along the shaft via a plurality of splines where the collar selectively slides among a plurality of positions. The positions comprise a first position to engage the first forward clutch gear, a second position to engage the second forward clutch gear, a third neutral position between the first end portion and the second end portion, a forth position to engage the reverse clutch gear and a fifth position to engage the stationary park flange to lock the shaft.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
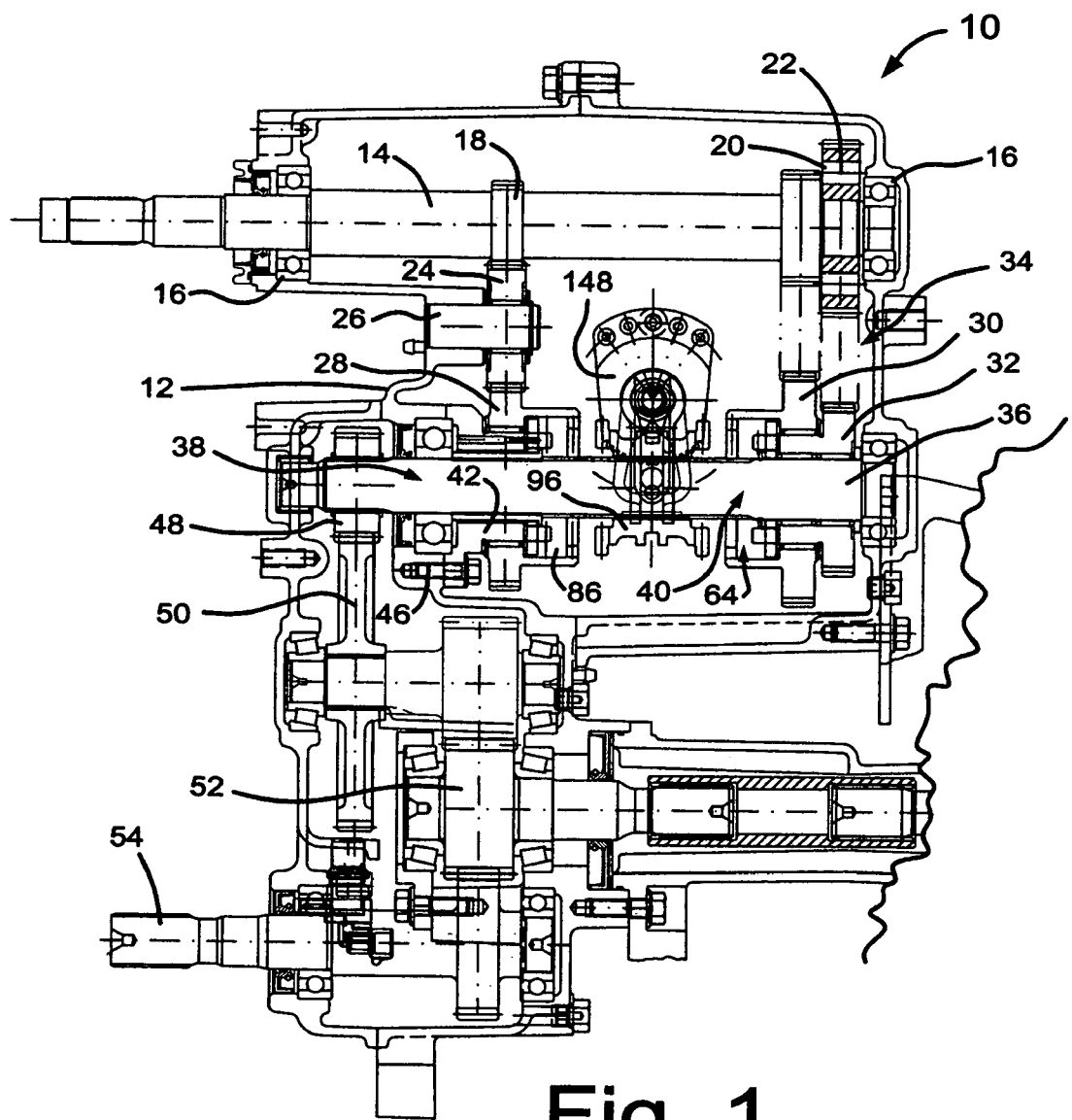
FIG. 1 is a schematic side view of a transmission assembly.

Referring now to FIG. 1, a transmission assembly 10 is depicted. The assembly 10 is substantially located with a housing 12. The housing 12 may be one-piece or it may be comprised of multiple pieces joined together, as known by those skilled in the art.

The assembly 10 comprises an input pinion shaft 14 mounted for rotation within the housing 12. The input pinion shaft 14 is connected to a prime mover, such as an internal combustion engine (not shown), to provide rotation to the shaft 14 in a single direction. At least two bearings 16 support the ends of the input pinion shaft 14 for rotation in the housing 12, as shown in FIG. 1.

Figure 2:
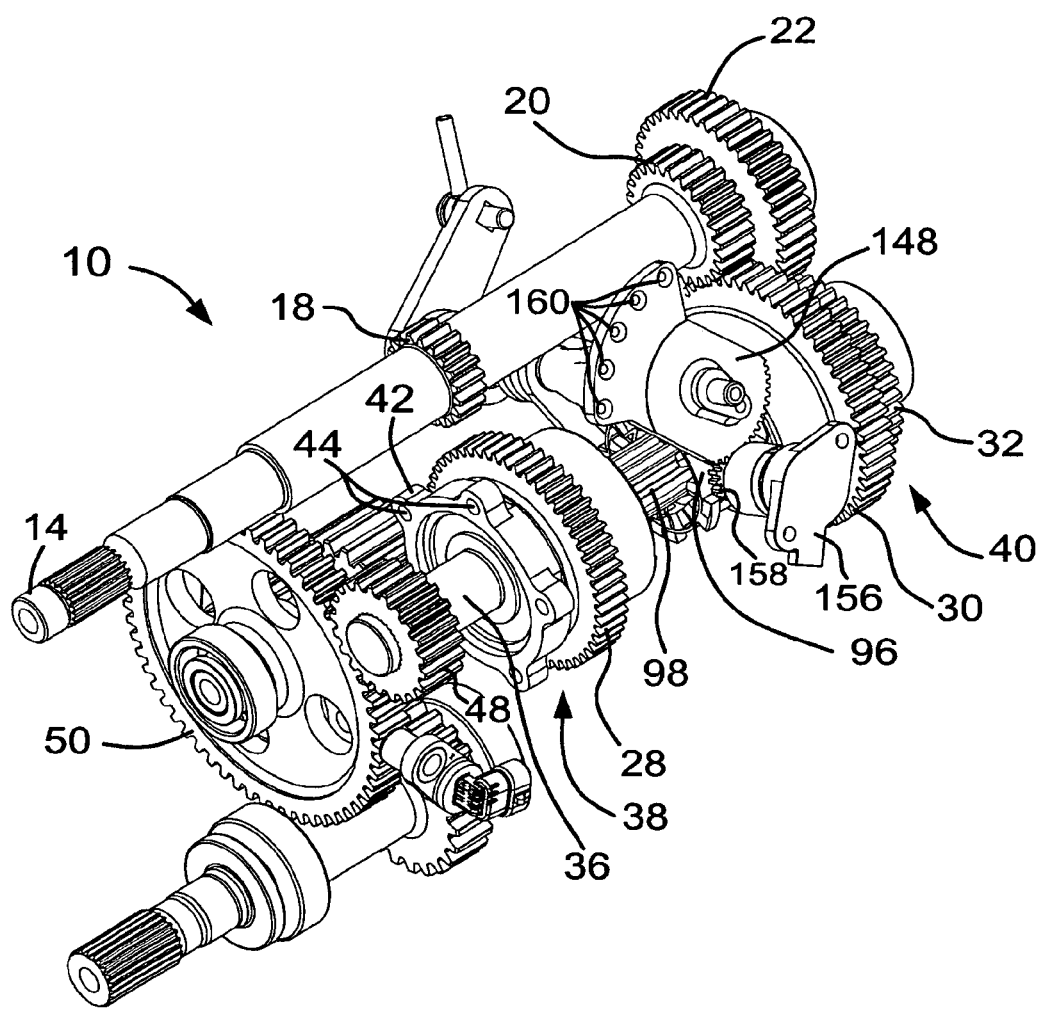
FIG. 2 is a schematic perspective view of some of the components of the transmission assembly depicted in FIG. 1.

Looking now at FIGS. 1 and 2, a reverse pinion 18, a first forward pinion 20 and a second forward pinion 22 can be seen located on the input pinion shaft 14. It can be appreciated that additional pinions can be located on the input pinion shaft 14 and the present invention is not limited to the three pinions 18, 20, 22 mentioned above.

The reverse pinion 18 is drivingly connected to a reverse idler gear 24, as shown in FIG. 1. The reverse idler gear 24 is mounted on a reverse idler gear shaft 26 that is supported by the housing 12 for rotation. The reverse idler gear 24 is drivingly connected to a reverse clutch gear 28. The reverse clutch gear 28 can be seen in FIGS. 1 and 2. If additional reverse clutch gears are desired, the input pinion shaft 14 merely has to be provided with associated reverse pinions and reverse idler gears.

The first forward pinion 20 may be such as a forward low pinion and the second forward pinion 22 may be such as a forward high pinion. The first forward pinion 20 is drivingly connected to a first forward clutch gear 30 and the second forward pinion 22 is drivingly connected to a second forward clutch gear 32. Of course, if additional pinion gears are utilized, as mentioned above, additional forward clutch gears will be provided.

FIG. 1 depicts a gap 34 between the forward pinion gears 20, 22 and the forward clutch gears 30, 32. In reality, such a gap 34 would not exist, however, it is depicted for purposes of clarity in the figure.

A clutch shaft 36, having a first end portion 38 and a second end portion 40, supports the first forward clutch gear 30 and the second forward clutch gear 32 for rotation about the second end portion 40. The first end portion 38 of the clutch shaft 36 supports the reverse clutch gear 28.

A park flange 42 is also located about the first end portion 38 of the clutch shaft 36. The park flange 42 is stationary with respect to the reverse clutch gear 28 and the clutch shaft 36. As can be seen in FIG. 2, the park flange 42 comprises a plurality of apertures 44 spaced about the perimeter of the flange 42. The apertures 44 each accept a mechanical fastener 46, such as a bolt or screw, that is secured to the housing 12, as shown in FIG. 1. The present invention, however, is not limited to securing the park flange 42 to the housing 12 with mechanical fasteners 46, but instead includes utilizing male/female couplings and similar connectors, rivets and welding to secure these to structures together.

The second end portion 40 of the shaft 36 also comprises a main pinion 48. The main pinion 48 is drivingly connected to a main gear 50, as seen in FIGS. 1 and 2. The main gear 50 is drivingly connected to a rear output pinion shaft 52 and a front output pinion shaft 54 for providing drive to one or more wheels, as known to those skilled in the art.

Figure 5C:
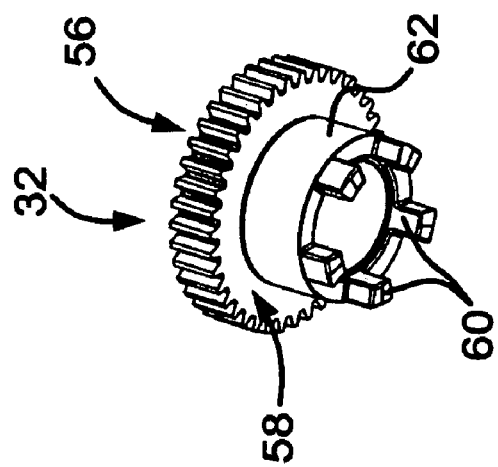
FIG. 5C is a schematic perspective view of a part of the present invention.

At least a portion of the second forward clutch gear 32 is located between the first forward clutch gear 30 and the shaft 36. More specifically, the second forward clutch gear 32 comprises a plurality of teeth 56 on an increased diameter portion 58 and a set of axially extending teeth 60 on a reduced diameter portion 62, as seen in FIG. 5C. The reduced diameter portion 62 fits within a void portion 64, best seen in FIG. 1, defined by the shaft 36 and a reduced diameter portion 66 of the first forward clutch gear 30. The reduced diameter portion 66 is best seen in FIG. 5B.

Figure 5B:
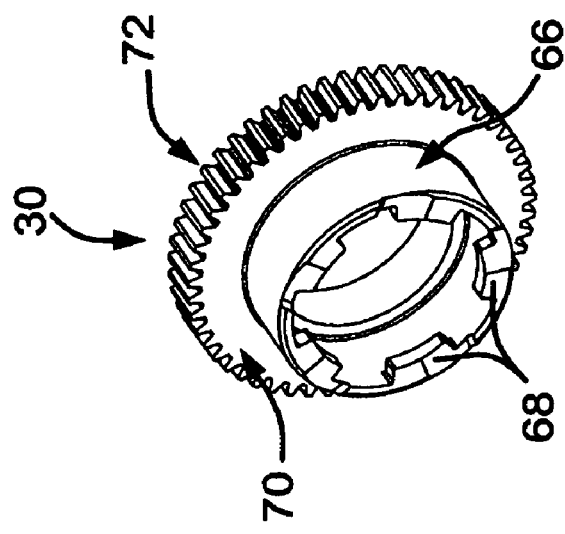
FIG. 5B is a schematic perspective view of a part of the present invention.

The reduced diameter portion 66 of the first forward clutch gear 30 has a plurality of internal teeth 68, as best seen in FIG. 5B. The first forward clutch gear 30 also comprises an increased diameter portion 70 having a plurality of external teeth 72. It can be appreciated that the pluralities of teeth 56, 72 on the increased diameter portions 58, 70 of the first forward clutch gear 30 and the second forward clutch gear 32 engage with the first forward pinion 20 and the second forward pinion 22, respectively.

Figure 4A:
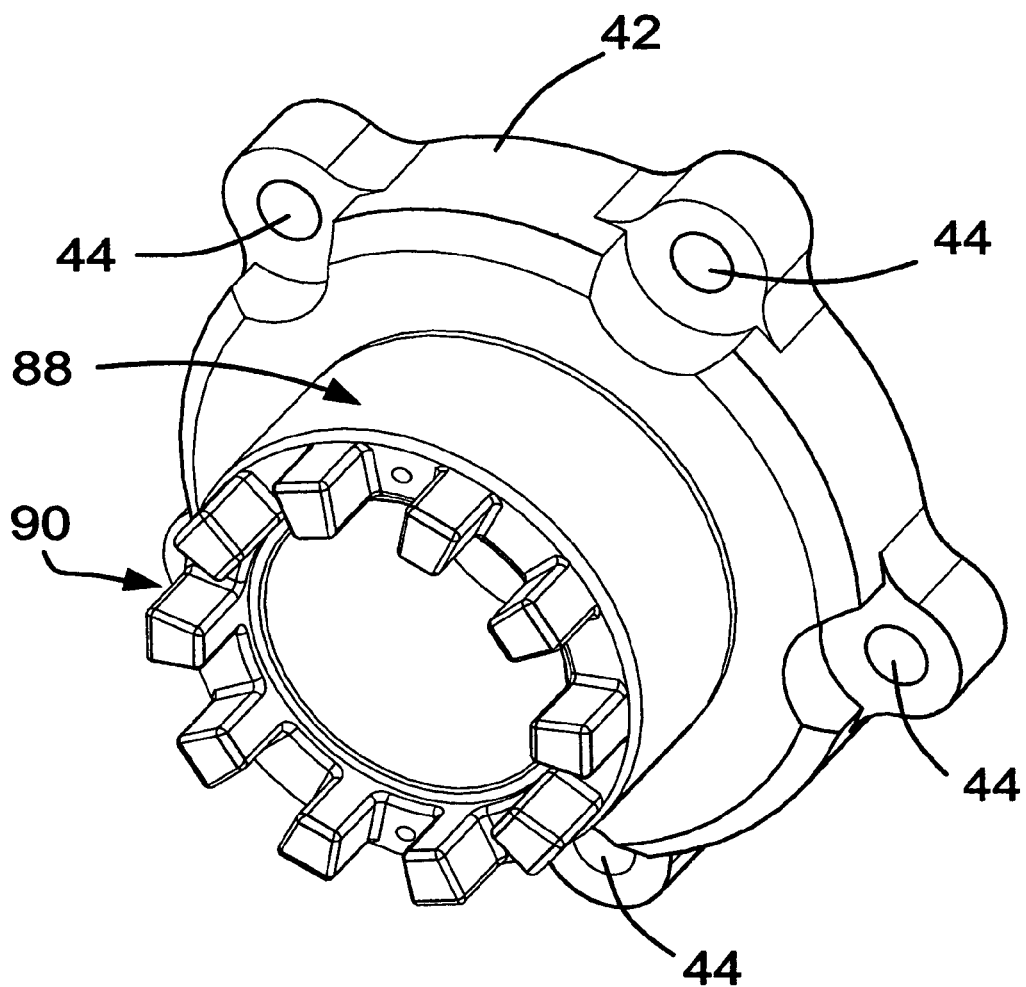
FIG. 4A is a schematic perspective view of a part of the present invention.
Figure 4B:
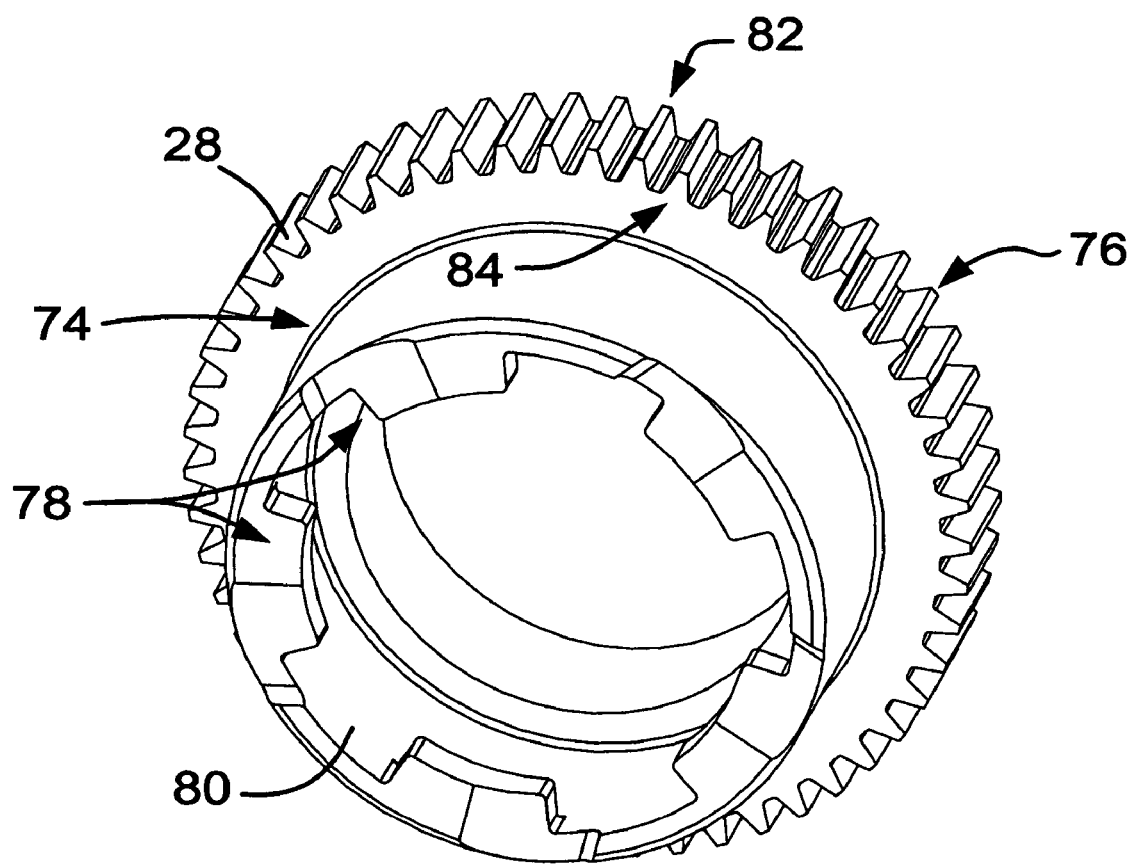
FIG. 4B is a schematic perspective view of a part of the present invention.

As can be seen in FIG. 4B, the reverse clutch gear 28 comprises a reduced diameter portion 74 and an increased diameter portion 76. The reduced diameter portion 74 has a plurality of teeth 78 on an internal surface 80. A plurality of teeth 82 are also located on an external surface 84 of the increased diameter portion 76. The teeth 82 are located in mesh with the reverse idler gear 24.

The reverse clutch gear 28 defines a void portion 86 between its reduced diameter portion 74 and the shaft 36. The void portion 86 can be seen in FIG. 1. As can be appreciated from FIGS. 2 and 4A, a reduced diameter section 88 of the park flange 42 is located in the void portion 86. The reduced diameter section 88 has a plurality of axially extending gear teeth 90.

Figure 5A:
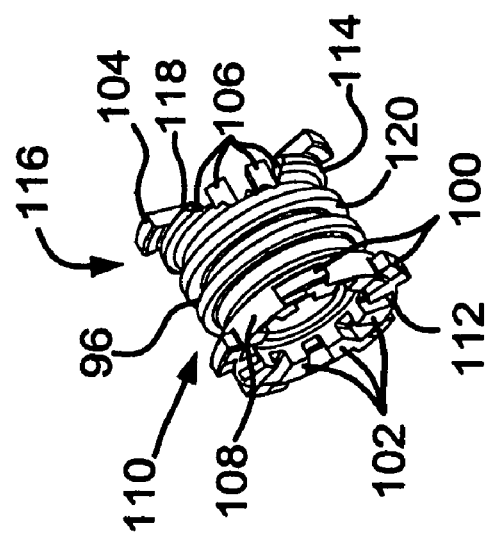
FIG. 5A is a schematic perspective view of a part of the present invention.

A first embodiment of a single shifting clutch 96, depicted in FIG. 2, is located on a plurality of splines 98 on the shaft 36. As best seen in FIG. 5A, the shifting clutch 96 is comprised of a first plurality of teeth 100, a second plurality of teeth 102, a third plurality of teeth 104 and a forth plurality of teeth 106. The first plurality of teeth 100 is located substantially about an outer periphery 108 of a first end 110 of the shifting clutch 96. The second plurality of teeth 102 is located substantially about an inner periphery 112 of the first end 110 of the shifting clutch 96. The third plurality of teeth 104 is located substantially about an outer periphery 114 of a second end 116 of the shifting clutch 96. The fourth plurality of teeth 106 is located substantially about an inner periphery 118 of the second end 116 of the shifting clutch 96.

Figure 3:
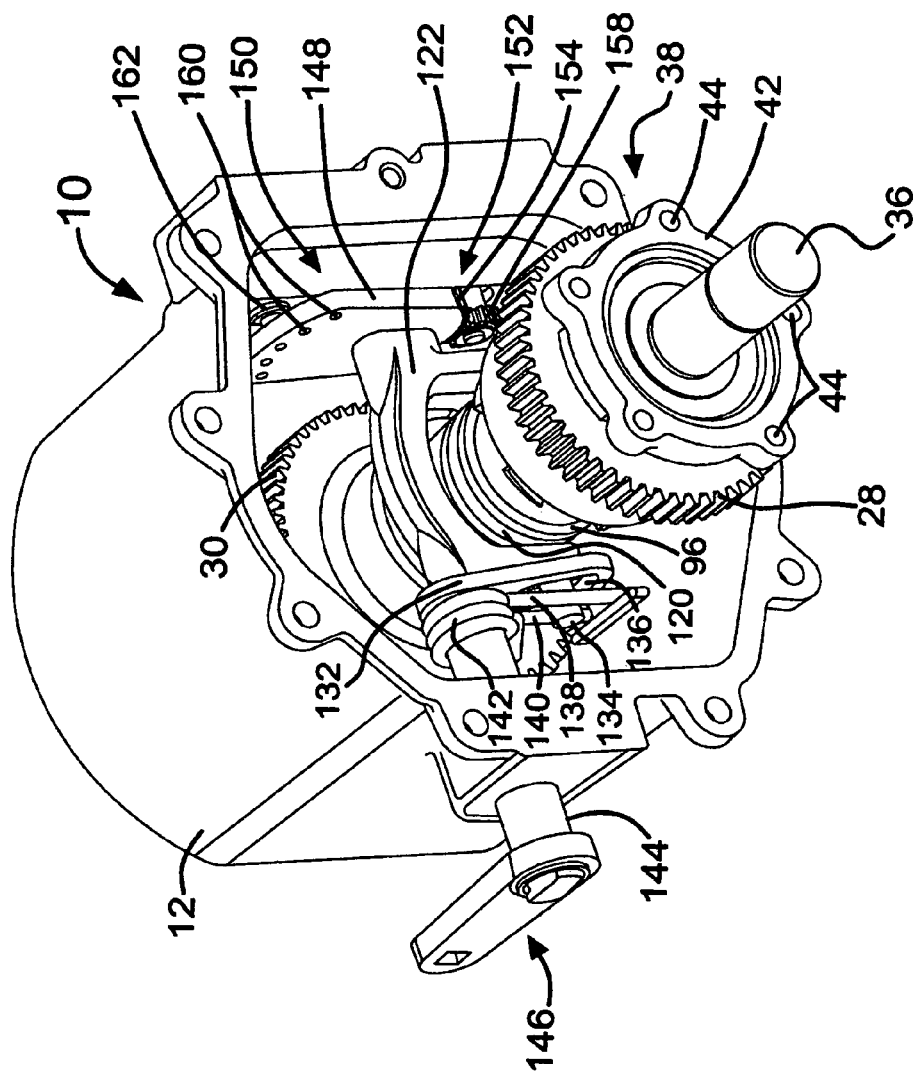
FIG. 3 is a schematic perspective view of some of the structures depicted in FIG. 2 within a housing.
Figure 3A:
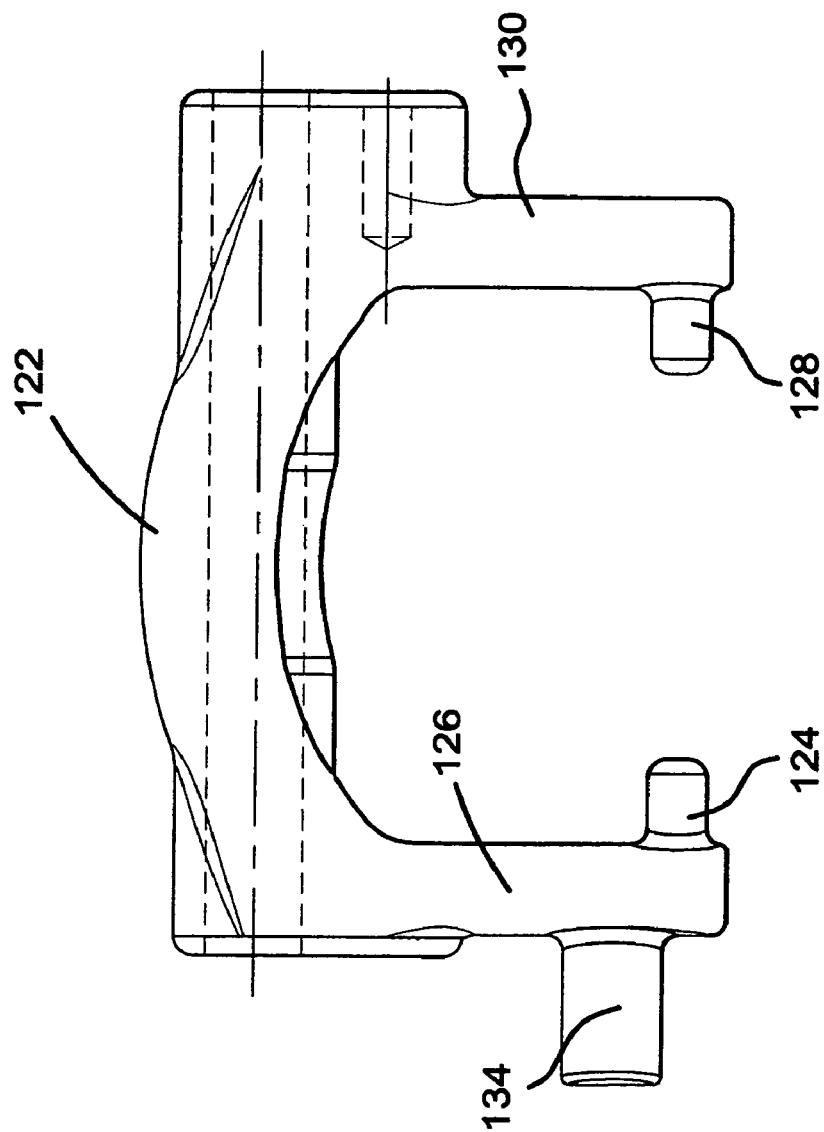
FIG. 3A is a schematic side view of one of the components depicted in FIG. 3.

At least one groove 120 is located about the shifting clutch 96, as best seen in FIGS. 3 and 5A. The groove 120 receives pegs from a clutch yoke 122, also seen in FIG. 3A, located about the shifting clutch 96. More preferably, a first peg 124 from a first leg 126 of the clutch yoke 122 is located in the groove 120 on one side of the shifting clutch 96 and a second peg 128 from a second leg 130 of the clutch yoke 122 is located in the groove 120 on the other side of the shifting clutch 96. It can be appreciated that the groove 120 is continuous about the shifting clutch 96 to permit the shifting clutch 96 to rotate relative to the pegs 124, 128.

A second embodiment (not shown) of the shifting clutch 96 comprises a single rib extending substantially about the circumference of the shifting clutch 96. Slotted guides are pinned to the legs, described below, of the yoke 122. The guides engage the rib. The guides pivot as the shifting clutch 96 moves along the shaft 36 as the shifting clutch 96 engages various gears, also described below.

Referring back to the first embodiment of the shifting clutch 96, the yoke 122 is mounted for pivotal movement within the housing 12, as best seen in FIG. 3. The yoke 122 is connected adjacent the first leg 126 to a plate 132. The plate 132 permits a third peg 134 to pass through an aperture 136 in the plate 132. The third peg 134 is at least partially bound by first and second spring legs 138, 140. The spring legs 138, 140 extend beyond the third peg 134 from a spring 142 coiled about an actuator shaft 144. The actuator shaft 144 is connected to a shift linkage mechanism 146. The shift linkage mechanism 146 is connected directly or indirectly to an operator's compartment or operator's area (neither of which are shown) of the vehicle.

The second leg 130 of the yoke 122 is connected to a detent gear 148, as depicted in FIG. 3. The detent gear 148 has an upper portion 150 and a lower portion 152. The lower portion 152 is preferably curvilinear and it has a plurality of teeth 154. As shown in FIGS. 2 and 3, the teeth 154 engage with a sensor 156 connected to a timing gear 158. The upper portion 150 has a plurality of apertures 160. The number of apertures 160 corresponds with the number of possible gearing selections of the transmission, such as forward low, forward high, neutral, reverse and park.

A spring plunger 162 is located in the path of the apertures 160 as they move with the detent gear 148. The spring plunger 162 is selectively engagable with the apertures 160 to lock the detent gear 148 when the transmission is located in a particular gear.

The sensor 156 senses the position of the detent gear 148, and thus the position of the shifting clutch 96. The sensor 156 is connected to an electronic display (not shown) that displays the exact position of the detent gear 148, and thus the shifting clutch 96, to the operator.

A preferred method of utilizing the present invention comprises rotating the input pinion shaft 14 with a prime mover. The rotation of the input pinion shaft 14 in turn rotates the reverse pinion 18, the first forward pinion 20 and the second forward pinion 22 located on the shaft 14. The reverse pinion 18 drives the reverse idler gear 24 which in turn drives the reverse clutch gear 28 on the clutch shaft 36. It can therefore be appreciated that when the input pinion shaft 14 is rotating, the reverse clutch gear 28 is rotating about the clutch shaft 36.

Concurrently, the first forward pinion 20 and the second forward pinion 22 are rotating the first forward clutch gear 30 and the second forward clutch gear 32, respectively, on the clutch shaft 36. The first forward clutch gear 30 and the second forward clutch gear 32 rotate independently from one another about the clutch shaft 36.

It can be appreciated that when the shifting clutch 96 is located between the reverse clutch gear 28 and the first forward clutch gear 30 on clutch shaft 36 that it is not engaged with any of the clutch gears 28, 30, 32. In this orientation, the transmission assembly 10 would be in a neutral position and drive would not be provided to the main pinion 48 on the first end portion 38 of the shaft 36.

When the vehicle operator desires to move the vehicle forward, he would move the shift linkage mechanism 146 in a predetermined direction and amount to cause the actuator shaft 144 to rotate. Rotation of the actuator shaft 144 pivots the clutch yoke 122 thus urging the shifting clutch 96 toward the first forward clutch gear 30. Preferably, the pegs 124, 128 of the clutch yoke 122 act against the groove 120 of the shifting clutch 96 to urge the shifting clutch 96 toward the first forward clutch gear 30. As mentioned above, the first forward clutch gear 30 can be a forward low clutch gear.

It can be appreciated that the third plurality of teeth 104 on the shifting clutch 96 may be or may not be aligned with the plurality of internal teeth 68 on the first forward clutch gear 30. If the teeth are aligned, then the clutch yoke 122 moves the teeth 68, 104 into engagement with one another. The spring plunger 162 is removed from its current aperture 160 and moved to the next adjacent aperture 160. The spring plunger 162 engages the aperture 160 to lock the detent plate 148 in place. The spring plunger 162 operates in this manner for each change of position of the shifting clutch 96 described below.

If the teeth 68 are not aligned, the spring 142 on the actuator shaft 144 permits the operator to move the shift linkage mechanism 146 but the shifting clutch 96 will not immediately also move since the legs 126, 130 of the spring 142 can deflect when the actuator shaft 144 rotates. It can also be appreciated that the shifting clutch 96 will not immediately move with the initial rotation of the actuator shaft 144 due to the peg 134 having to move a predetermined distance within the aperture 136 of the plate 132 before engaging the plate 132. Once the teeth 68, 104 are aligned, the deflected spring 142 urges the clutch yoke 122, through the plate 132, into engagement with the first forward clutch gear 30.

Engagement of the teeth 68, 104 causes the shifting clutch 96 to rotate with the first forward clutch gear 30. Since the shifting clutch 96 is mounted on the clutch shaft 36 via the plurality of splines 98, the shifting clutch 96 causes the clutch shaft 36 to rotate. Rotation of the clutch shaft 36 results in the main pinion 48 providing drive to the main gear 50 so that drive is provided to the wheels of the vehicle. It can be appreciated that engagement of the shifting clutch 96 with the first forward clutch gear 30 comprises another position of the shifting clutch 96, in addition to the neutral position.

Should the vehicle operator desire to shift from the first forward clutch gear 30 to the second forward clutch gear 32, he moves the shift linkage mechanism 146 a predetermined distance and direction causing the actuator shaft 144 to rotate again. Rotation of the actuator shaft 144 urges the clutch yoke 122 to pivot and move the shifting clutch 96. Preferably, the shifting clutch 96 is moved along the splines 98 of the clutched shaft 36 so that the third plurality of teeth 104 and the plurality of internal teeth 68 on the first forward clutch gear 30 are disengaged. The shifting clutch 96 is urged further toward the second end portion 40 of the clutch shaft 36 so that the fourth plurality of teeth 106 on the shifting clutch 96 and the plurality of axially extending teeth 60 on the second forward clutch gear 32 engage with one another.

In this embodiment, since the second forward clutch gear 32 is mated with the second forward pinion 22 and each gear 22, 32 is sized and provided with teeth to provide a predetermined amount of rotation to the clutch shaft 36, the clutch shaft 36 rotates at a higher speed than when the shifting clutch 96 is mated with the first forward clutch gear 30. By way of example and as mentioned above, the second forward clutch gear 32 may be a forward high clutch gear. Engagement of the shifting clutch 96 with the second forward clutch gear 32 comprises another position of the shifting clutch 96.

Through the structures mentioned above, this combination of gears 22, 32 causes the wheels of the vehicle to rotate faster. The spring 142 functions in the same way described above to permit the shift linkage mechanism 146 to be moved by the operator even when the teeth 106 of the clutch 96 and the teeth 60 of the second forward clutch gear 32 are not aligned.

To put the vehicle in reverse, the operator moves the shift linkage mechanism 146 so that it rotates the actuator shaft 144 in the opposite direction from that described above. The actuator shaft 144 urges the clutch yoke 122 to pivot and the pegs 124, 128 of the yoke 122 urge the shifting clutch 96 toward the reverse clutch gear 28 on the first end portion 38 of the clutch shaft 36. The first plurality of teeth 100 on the shifting clutch 96 may or may not be aligned with the plurality of teeth 78 on the reduced diameter portion 74 of the reverse clutch gear 28. If the teeth 78, 100 are not aligned, the spring 142 and the aperture 136 permit the shift linkage mechanism 146 to be moved without damaging the teeth 78, 100 of either the shifting clutch 96 or the reverse clutch gear 28. The legs 138, 140 of the spring 142 move the clutch yoke 122 and the shifting clutch 96 with it, when the teeth 78, 100 are properly aligned.

Once the teeth 78, 100 are aligned, the first plurality of teeth 100 on the shifting clutch 96 are engaged with the plurality of teeth 78 on the internal surface 80 of the reverse clutch gear 28. Rotation from the reverse clutch gear 28 is imparted to the shifting clutch 98 to drive the clutch shaft 36 and thus the gears driven by the clutch shaft 36 as described above. Engagement of the reverse clutch gear 28 with the shifting clutch 96 comprises another position of the shifting clutch 96.

The transmission assembly 10 can be placed in park by moving the shift linkage mechanism 146 yet again so that the actuator shaft 144 rotates thus causing the clutch yoke 122 to pivot. The clutch yoke 122 is designed to pivot sufficiently so that the pegs 124, 128 move the teeth 100 of the shifting clutch 96 beyond, and thus out of engagement with, the teeth 78 of the reverse clutch gear 28. The second plurality of teeth 102 of the shifting clutch 96 are engaged with the non-rotating gear teeth 90 of the park flange 42. As mentioned above, since the park flange 42 is secured to the transmission housing 10, the shifting clutch 96, and thus the clutch shaft 36, the main pinion 48, the main gear 50, the output shafts 52, 54 and thus the wheels are locked. Engagement of the shifting clutch 96 with the park flange 42 comprises another position of the shifting clutch 96.

It can be appreciated that while the clutch shaft 36 is locked, the input pinion shaft 14 and its associated pinions 18, 20, 22, as well as the reverse clutch gear 28, the first forward clutch gear 30 and the second forward clutch gear 32 are free to rotate.

The operator of the vehicle can at all times determine the position of the shifting clutch 96 by virtue of the sensor 156 engaged with the detent gear 148. As the detent gear 148 turns with the clutch yoke 122, the teeth 154 on the detent gear 148 rotate the teeth 158 on the sensor 156. The sensor 156 associates the rotation amount and direction with a position of the shifting clutch 96 and provides a signal to the display for the operator to see.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A system for a multi-position clutch, comprising:
   a rotatable clutch shaft having a first end portion and a second end portion;
   a reverse clutch gear rotatable about said shaft and located about said first end portion of said shaft;
   a stationary park flange, said park flange having gear teeth extending into a first void portion defined by said reverse clutch gear and said shaft, said park flange being located about said first end portion of said shaft;
   a first forward clutch gear rotatable about said shaft and a second forward clutch gear rotatable about said shaft independently from said first forward clutch gear, where both clutch gears are located about said second end portion, said second forward clutch gear having gear teeth that extend into a second void portion defined by said first forward clutch gear and said shaft; and
   a single, shifting clutch slidable along said shaft via a plurality of splines where said shifting clutch selectively slides among a plurality of positions comprising a first position to engage said first forward clutch gear, a second position that is said second void portion to engage said second forward clutch gear, a third neutral position between said first end portion and said second end portion, a fourth position to engage said reverse clutch gear and a fifth position that is said first void portion to engage said stationary park flange to lock said shaft.

2. The system of claim 1, wherein said clutch shaft has a main pinion on said first end portion, said main pinion in driving engagement with a main gear and said main gear in driving engagement with two output pinion shafts.

3. The system of claim 1, wherein said reverse clutch gear has a plurality of teeth on an increased diameter portion for engagement with a reverse idler gear driven by an input pinion shaft and said reverse clutch gear also having a plurality of teeth on an internal surface for selective engagement with a first plurality of teeth on said shifting clutch.

4. The system of claim 1, wherein said park flange has a plurality of apertures for receiving mechanical fasteners to attach said park flange to a transmission housing.

5. The system of claim 1, wherein said gear teeth of said park flange selectively engage with a second plurality of teeth on said shifting clutch.

6. The system of claim 4, wherein said clutch shaft, said reverse clutch gear, said park flange, said first forward clutch gear, said second forward clutch gear and said shifting clutch are all located within said transmission housing.

7. The system of claim 3, wherein said first forward clutch gear has a plurality of external teeth drivingly engaged with a first forward pinion on said input pinion shaft, said first forward clutch gear also having a plurality of teeth for selective engagement with a third plurality of teeth on said shifting clutch.

8. The system of claim 7, wherein said second forward clutch gear has a plurality of teeth drivingly engaged with a second forward pinion on said input pinion shaft, said second forward clutch gear also having a plurality of teeth for selective engagement with a fourth plurality of teeth on said shifting clutch.

9. The system of claim 1, wherein said shifting clutch has a groove for receiving a yoke, said yoke connected to a shift linkage mechanism for selective movement of said yoke and said shifting clutch to one of said plurality of positions.

10. A shifting mechanism, comprising:
    a rotatable clutch shaft having a first end portion and a second end portion;
    a reverse clutch gear and a stationary park flange located about said first end portion of said shaft;
    a first forward clutch gear located about said second end portion of said shaft;
    a single, shifting clutch slidable along said shaft via a plurality of splines;
    a clutch yoke located over said shifting clutch, said yoke having a first side engaged with said shifting clutch and a second side engaged with said shifting clutch;
    a detent gear connected to said first side of said shifting clutch;
    a plate connected to a spring and said second side of said shifting clutch; and
    a shift linkage mechanism connected to said spring, said shift linkage mechanism for selectively urging said shifting clutch into one of said clutch gears or said park flange.

11. The system of claim 10, further comprising a second forward clutch gear located about said second end portion of said shaft.

12. The system of claim 11, wherein said clutch shaft, said reverse clutch gear, said park flange, said first forward clutch gear, said second forward clutch gear and said shifting clutch are all located within the same transmission housing.

13. The system of claim 11, wherein said reverse clutch gear has a plurality of teeth on an increased diameter portion for engagement with a reverse idler gear driven by an input pinion shaft and said reverse clutch gear also having a plurality of teeth on an internal surface for selective engagement with a first plurality of teeth on said shifting clutch.

14. The system of claim 12, wherein said park flange has a plurality of apertures for receiving mechanical fasteners to attach said park flange to said transmission housing.

15. The system of claim 11, wherein said park flange has a plurality of teeth for selectively engaging with a second plurality of teeth on said shifting clutch.

16. The system of claim 13, wherein said first forward clutch gear has a plurality of external teeth drivingly engaged with a first forward pinion on said input pinion shaft, said first forward clutch gear also having a plurality of internal teeth for selective engagement with a third plurality of teeth on said shifting clutch.

17. The system of claim 13, wherein said second forward clutch gear has a plurality of teeth drivingly engaged with a second forward pinion on said input pinion shaft, said second forward clutch gear also having a plurality of teeth for selective engagement with a fourth plurality of teeth on said shifting clutch.

18. The system of claim 10, wherein said shifting clutch has a groove for receiving said yoke, said yoke engaged with said groove to urge said shifting clutch between said first end portion of said shaft and said second end portion of said shaft.

19. A method of locking a transmission, comprising:
providing a rotating reverse clutch gear and a stationary park flange about a first end portion of a rotatable shaft;
providing a rotating first forward clutch gear and a rotating second forward clutch gear about a second end portion of said shaft;
providing a shifting clutch slidable between said first end portion and said second end portion of said shaft; and
selectively sliding said shifting clutch along said shaft with a shift linkage mechanism and a clutch yoke to engage said shifting clutch with said stationary park flange wherein when said shifting clutch engages with said stationary park flange, said shaft is prevented from rotating.

20. The method of claim 19, wherein at least part of said reverse clutch gear rotates about gear teeth on said park flange, said reverse clutch gear being driven by a reverse idler gear driven by a reverse pinion on an input pinion shaft.

21. The method of claim 19, wherein said shifting clutch causes said shaft to rotate in a reverse direction when said shifting clutch slides along said shaft and a first plurality of teeth on said shifting clutch engages with a plurality of teeth on an internal surface of said reverse clutch gear.

22. The method of claim 21, wherein said shifting clutch locks said shaft when said clutch slides past said plurality of teeth on said internal surface of said reverse clutch gear and a second plurality of teeth on said shifting clutch engages with said gear teeth on said park flange.

23. The method of claim 22, wherein said shifting clutch causes said shaft to rotate at a first forward speed when a third plurality of teeth on said shifting clutch engage with a plurality of teeth on said first forward clutch gear.

24. The method of claim 23, wherein said shifting clutch causes said shaft to rotate at a second forward speed when said third plurality of teeth of said shifting clutch slide past said plurality of teeth on said first forward clutch gear and a fourth plurality of teeth on said shifting clutch engages with a plurality of teeth on said second forward clutch gear.

25. The method of claim 24, further comprising permitting movement of said shift linkage mechanism even when any of said plurality of teeth on said shifting clutch are not aligned with said plurality of teeth on any of said clutch gears about to be engaged with said shifting clutch by permitting a spring connected to said shift linkage mechanism to deflect until one of said clutch gears about to be engaged rotates relative to said shifting clutch so that said plurality of teeth on one of said clutch gears about to be engaged are aligned with a corresponding plurality of teeth on said shifting clutch.

26. A system for a multi-position clutch, comprising:
a rotatable clutch shaft;
a reverse clutch gear rotatable about said shaft;
a stationary park flange, said park flange having gear teeth extending into a first void portion defined by said reverse clutch gear and said shaft; and
a single, shifting clutch slidable along said shaft to selectively engage a set of teeth on said reverse clutch gear with one set of teeth on said shifting clutch or to engage said teeth on said park flange with another set of teeth on said shifting clutch, wherein engagement of said shifting clutch with said park flange locks said shaft.

* * * * *